US012616891B2

(12) United States Patent
Ungstrup et al.

(10) Patent No.: US 12,616,891 B2
(45) Date of Patent: May 5, 2026

(54) SYSTEM AND METHOD FOR EVALUATING SPORT BALL DATA

(71) Applicant: TRACKMAN A/S, Vedbaek (DK)

(72) Inventors: Michael Ungstrup, Vedbaek (DK);
Fredrik Tuxen, Rungsted Kyst (DK)

(73) Assignee: TRACKMAN A/S, Hørsholm (DK)

( * ) Notice: Subject to any disclaimer, the term of this patent is extended or adjusted under 35 U.S.C. 154(b) by 318 days.

(21) Appl. No.: 17/817,137

(22) Filed: Aug. 3, 2022

(65) Prior Publication Data

US 2023/0040575 A1     Feb. 9, 2023

Related U.S. Application Data

(60) Provisional application No. 63/203,927, filed on Aug. 4, 2021.

(51) Int. Cl.
| | |
|---|---|
| *A63B 71/06* | (2006.01) |
| *G06T 7/20* | (2017.01) |
| *G06T 7/70* | (2017.01) |
| *G06T 7/80* | (2017.01) |
| *G06V 40/10* | (2022.01) |
| *A63B 102/18* | (2015.01) |

(52) U.S. Cl.
CPC ............ *A63B 71/0605* (2013.01); *G06T 7/20* (2013.01); *G06T 7/70* (2017.01); *G06T 7/80* (2017.01); *G06V 40/10* (2022.01); *A63B 2102/18* (2015.10); *A63B 2220/807* (2013.01); *A63B 2220/89* (2013.01); *G06T 2207/30196* (2013.01); *G06T 2207/30224* (2013.01); *G06T 2207/30241* (2013.01)

(58) Field of Classification Search
CPC ............ A63B 71/0605; A63B 2102/18; A63B 2220/807; A63B 2220/89; G06T 7/80; G06T 7/70; G06T 7/20; G06T 2207/30196; G06T 2207/30224; G06T 2207/30241; G06V 40/10
See application file for complete search history.

(56) References Cited

U.S. PATENT DOCUMENTS

| | | | |
|---|---|---|---|
| 6,571,193 B1 * | 5/2003 | Unuma | .................. G06V 40/23 |
| | | | 340/853.2 |
| 10,058,756 B1 * | 8/2018 | Basilone | ............ A63B 69/0002 |
| 10,076,698 B2 * | 9/2018 | Spivak | .................... G06T 7/246 |

(Continued)

FOREIGN PATENT DOCUMENTS

| | | |
|---|---|---|
| WO | 01/54781 | 8/2001 |
| WO | 2020/101094 | 5/2020 |

*Primary Examiner* — Malina D. Blaise
(74) *Attorney, Agent, or Firm* — Fay Kaplun & Marcin, LLP

(57)     ABSTRACT

A system and a method related for evaluation of sport ball data. The method includes calibrating a first coordinate system of a first camera to a second coordinate system of a baseball field; capturing, with the first camera, one or more images including a first batter; determining biometric characteristics of the first batter based on the one or more images and the calibration of the first camera to the baseball field; mapping the biometric characteristics of the first batter to an upper positional limit and a lower positional limit of a first strike zone for the first batter; and determining positional limits of the first strike zone in the second coordinate system.

20 Claims, 7 Drawing Sheets

(56)     References Cited

U.S. PATENT DOCUMENTS

| | | | | |
|---|---|---|---|---|
| 10,754,025 | B2 * | 8/2020 | Asghar | G06F 18/251 |
| 10,894,198 | B1 * | 1/2021 | Teeger | A63B 71/0605 |
| 11,117,035 | B2 * | 9/2021 | Stemle | A63B 69/0002 |
| 11,790,536 | B1 * | 10/2023 | Berme | G06T 7/70 |
| | | | | 382/107 |
| 2003/0134724 | A1 * | 7/2003 | Tuttle | A63B 21/4001 |
| | | | | 482/105 |
| 2012/0316843 | A1 * | 12/2012 | Beno | G06Q 10/0639 |
| | | | | 703/2 |
| 2013/0244211 | A1 * | 9/2013 | Dowling | G16H 20/30 |
| | | | | 434/247 |
| 2015/0019135 | A1 * | 1/2015 | Kacyvenski | G01P 7/00 |
| | | | | 702/19 |
| 2016/0307335 | A1 * | 10/2016 | Perry | G06T 7/292 |
| 2017/0100658 | A1 * | 4/2017 | Tally | A63B 69/0002 |
| 2017/0151481 | A1 * | 6/2017 | Divine | A63B 71/10 |
| 2017/0200277 | A1 * | 7/2017 | Keat | G06T 7/248 |
| 2017/0333777 | A1 * | 11/2017 | Spivak | G06V 20/42 |
| 2018/0052228 | A1 * | 2/2018 | Markison | A63B 71/06 |
| 2018/0207508 | A1 * | 7/2018 | Lee | A63B 69/0002 |
| 2018/0272224 | A1 * | 9/2018 | Chen | G06V 40/28 |
| 2019/0053762 | A1 * | 2/2019 | Saigh | A61B 5/7455 |
| 2019/0054347 | A1 * | 2/2019 | Saigh | A61B 5/103 |
| 2019/0192053 | A1 * | 6/2019 | Saigh | G16H 20/30 |
| 2020/0394413 | A1 * | 12/2020 | Bhanu | G06N 3/045 |
| 2021/0319618 | A1 * | 10/2021 | Lee | H04N 13/117 |
| 2022/0284628 | A1 * | 9/2022 | Tuxen | H04N 23/695 |
| 2024/0173608 | A1 * | 5/2024 | Schembs | A63B 71/06 |
| 2024/0245971 | A1 * | 7/2024 | Spivak | G06V 20/42 |
| 2024/0331170 | A1 * | 10/2024 | Gupta | G06V 10/82 |
| 2024/0424373 | A1 * | 12/2024 | Merrell | G01L 5/0052 |

* cited by examiner

Network Arrangement 1

Computing Device 10

Wireless Network 20

First Camera 115

Radar 110

Second Camera 125

Computing Device 10

Processor 11

Memory Arrangement 12

Transceiver 13

I/O Device 14

Display 15

Other Components 16

Method 400

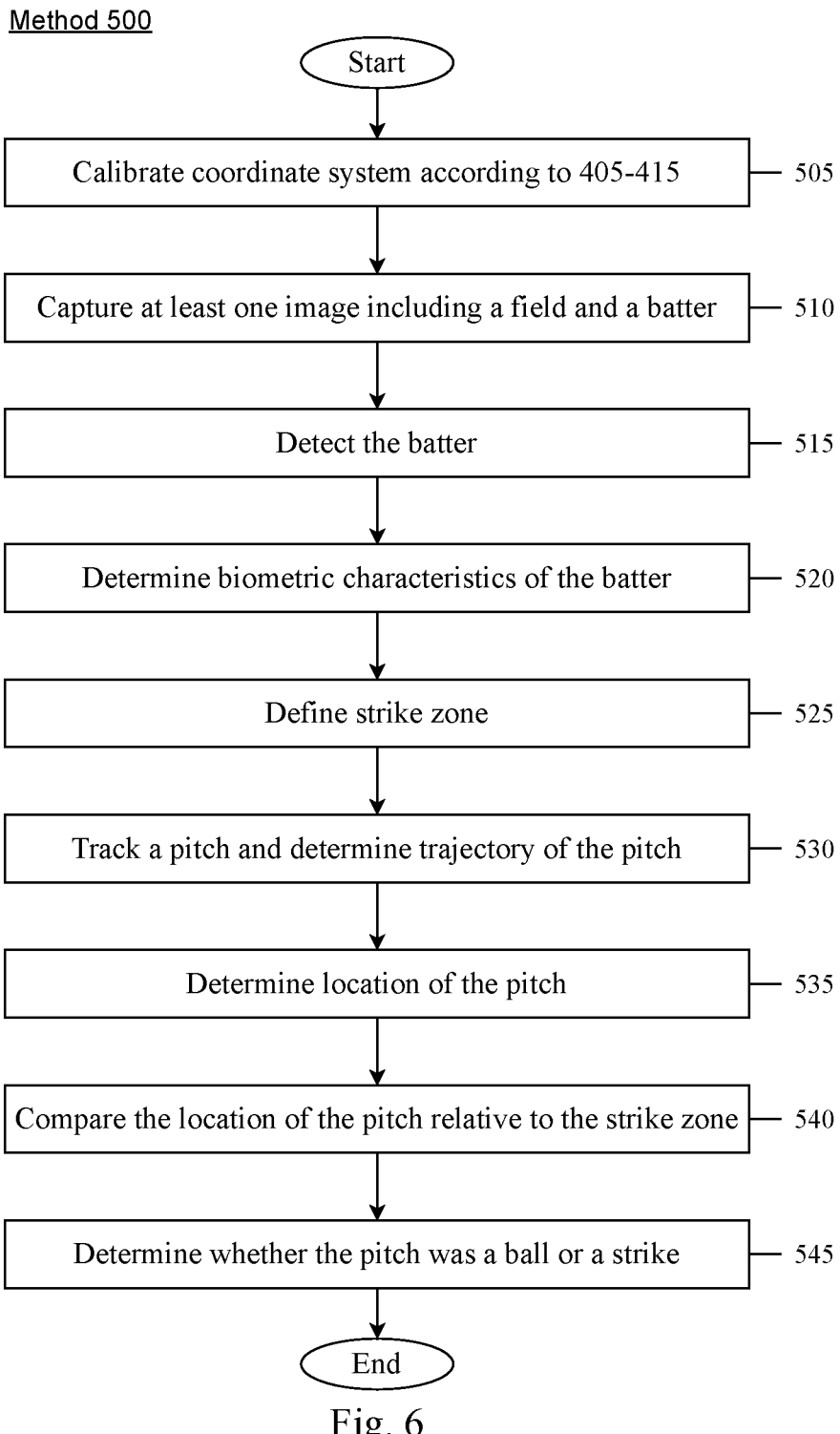

Method 500

Start

Calibrate coordinate system according to 405-415 — 505

Capture at least one image including a field and a batter — 510

Detect the batter — 515

Determine biometric characteristics of the batter — 520

Define strike zone — 525

Track a pitch and determine trajectory of the pitch — 530

Determine location of the pitch — 535

Compare the location of the pitch relative to the strike zone — 540

Determine whether the pitch was a ball or a strike — 545

End

Fig. 6

Method 600

SYSTEM AND METHOD FOR EVALUATING SPORT BALL DATA

PRIORITY CLAIM

The present disclosure claims priority to U.S. Provisional Patent Application Ser. No. 63/203,927 filed Aug. 4, 2021; the disclosure of which is incorporated herewith by reference.

BACKGROUND

Calling strikes and balls and the making of other judgment calls as well as the application of rules to observed actions is an integral and important part of the game of baseball. Strikes and balls are called by the home plate umpire after every pitch has passed the batter unless the batter makes contact with the baseball (in which case the pitch is automatically a strike). Of course, determining whether the batter has made contact with the pitched ball is one more judgment call that is currently decided by the umpire. Under the current rules of Major League Baseball, the official strike zone is the area over home plate from the midpoint between the batter's shoulders and the top of the uniform pants to a point just below the kneecap of the batter. By rule, the strike zone is determined when the batter is positioned in the batter's stance and prepared to swing at a pitched ball. Thus, a first batter's strike zone is typically different from a second batter's strike zone, and the strike zone for a given batter may change between or during at-bats and between ball games.

Systems measuring baseball flight and evaluating pitches during a game have existed and received much attention for years. One exemplary system employs a Multi-Frequency Continuous Wave (MFCW) X-band Doppler radar. Radar waves transmitted from the radar and reflected by the baseball in flight generate an observable Doppler shift when received by the radar. This shift is proportional to the radial velocity of the baseball in relation to the radar. The radar measures the direction from the radar to the ball by employing multiple receiving antennas and observing phase differences associated with the signals received at these receivers. By employing multiple frequencies, the range to the ball can also be determined. For tracking pitches, a so called "high-home" location is a particularly advantageous placement of the radar from which to make measurements of radial velocity as the signal strength of reflected waves is consistently high. The "high-home" location places the radar in a position elevated above the pitcher's rubber and home plate and behind home plate—preferably with the radar securely mounted to existing structures such as a fence or the stands. This position is generally selected to gain as clear a view of home plate as possible while minimizing obstruction from the batter, the catcher and the umpire.

In another example, a camera-based system may employ cameras with a high frame rate (e.g., 60 Hz or higher), high resolution (e.g., HD, 4K, or even higher) and a field-of-view covering the area over which a pitch is likely to be thrown (e.g., including the pitcher's rubber, home plate and the batter's box, the area therebetween and an immediately surrounding area). The ball's position in an image plane may be detected when the ball is in the field of view of the camera. The position of the ball may, for example, be defined by a vector in space from the focal point of the camera to the 3D position of the ball. Detecting the ball using multiple cameras simultaneously allows the 3D position of the baseball to be determined by combining these vectors (e.g., via triangulation in known stereo vision techniques).

In still another example, a system can include both a radar and one or more cameras, where the observations from both types of sensors are combined to determine a path of flight of a ball. Regardless of the type of system used, it is advantageous to synchronize the sensor input or to otherwise timestamp observations and employ sensor fusion across modalities.

SUMMARY

The present disclosure relates to a method which includes calibrating a first coordinate system of a first camera to a second coordinate system of a baseball field; capturing, with the first camera, one or more images including a first batter; determining biometric characteristics of the first batter based on the one or more images and the calibration of the first camera to the baseball field; mapping the biometric characteristics of the first batter to an upper positional limit and a lower positional limit of a first strike zone for the first batter; and determining positional limits of the first strike zone in the second coordinate system.

In an embodiment, the method further includes tracking a flight of a pitched ball; and determining whether the flight of the ball includes a three-dimensional position where a portion the pitched ball is within the positional limits of the first strike zone in the second coordinate system.

In an embodiment, the method further includes determining a three-dimensional trajectory of the ball, wherein, determining whether the flight of the pitched ball includes a three-dimensional position where a portion of the pitched ball is within the positional limits of the first strike zone in the second coordinate system includes determining whether the trajectory of the pitched ball includes a three-dimensional position where a portion the pitched ball is within one radius of the pitched ball of the positional limits of first the strike zone in the second coordinate system.

In an embodiment, the method further comprising outputting a strike call when the flight of the pitched ball includes the three-dimensional position where the pitched ball is within the positional limits of the first strike zone in the second coordinate system; and outputting a ball call when the flight of the pitched ball does not include a three-dimensional position where the pitched ball is within the positional limits of the first strike zone in the second coordinate system.

In an embodiment, the flight of the pitched ball is tracked using a tracking device including a radar device and a second camera mounted in a high home position.

In an embodiment, the first and second cameras and the radar device are time synced to one another and the method further includes identifying a time of a key moment relating to the pitched ball based on data from the radar device; and selecting an image from one of the first and second cameras corresponding to the time of the key moment for mapping the biometric characteristics of the first batter to an upper positional limit and a lower positional limit of the first strike zone.

In an embodiment, it is determined that the flight of the pitched ball includes a three-dimensional position where a portion of the pitched ball is within the positional limits of the first strike zone in the second coordinate system when any one of the three-dimensional positions of the pitched ball is no further than one radius of the pitched ball from the positional limits of the first strike zone in the second coordinate system.

In an embodiment, the biometric characteristics of the first batter are mapped to the upper positional limit and the lower positional limit of the first strike zone based on a first identified anatomical feature of the first batter corresponding to the lower positional limit of the first strike zone.

In an embodiment, the biometric characteristics of the first batter are mapped to the upper positional limit of the first strike zone based on a predetermined height added to a height of a second identified anatomical feature of the first batter.

In an embodiment, the upper positional limit of the first strike zone is determined by adding a predetermined height to a height of the first identified anatomical feature of the first batter.

In an embodiment, the predetermined height is based on the biometric characteristics of the first batter.

In an embodiment, the positional limits of the first strike zone are determined in the second coordinate system based on a plane corresponding to a width of a home plate in a vertical plane perpendicular to a line from a center of a pitching rubber to a center of the home plate.

In addition, the present disclosure relates to a method including calibrating a first coordinate system of a camera to a second coordinate system of a baseball field; capturing, with the camera, one or more images including a first batter; determining pose data corresponding to a three-dimensional pose of the first batter based on the one or more images and the calibration of the camera to the baseball field; mapping the pose data of the first batter to at least one of an upper positional limit and a lower positional limit of a first strike zone for the first batter; and determining positional limits of the first strike zone in the second coordinate system based on the mapped at least one of the upper and lower positional limits of the first strike zone.

In an embodiment, the method further includes tracking a flight of a pitched ball; and determining whether the flight of the pitched ball includes a three-dimensional position where the pitched ball is within the positional limits of the first strike zone in the second coordinate system.

In an embodiment, the method further includes outputting a strike call when the flight of the pitched ball includes the three-dimensional position where the pitched ball is within the positional limits of the first strike zone in the second coordinate system; and outputting a ball call when the flight of the pitched ball does not include a three-dimensional position where the pitched ball is within the positional limits of the first strike zone in the second coordinate system.

In addition, the present disclosure relates to a system for monitoring a baseball game includes a first sensor arrangement configured to capture one or more images including a first batter; and a processor configured to: calibrate a first coordinate system of the first sensor arrangement to a second coordinate system of a baseball field; determine biometric characteristics of the first batter based on the one or more images and the calibration of the first sensor arrangement to the baseball field; map the biometric characteristics of the first batter to one of an upper positional limit and a lower positional limit of a first strike zone for the first batter; and determine positional limits of the first strike zone in the second coordinate system.

In an embodiment, the system further includes a second sensor arrangement configured to track a flight of a first pitched ball, wherein the processor is further configured to: determine, when the first batter is a current batter, whether the flight of the ball includes a three-dimensional position where a portion the ball is within the positional limits of the first strike zone in the second coordinate system.

In an embodiment, the processor is further configured to determine a three-dimensional trajectory of the first pitched ball; and determine, when the first batter is the current batter, whether the trajectory of the first pitched ball includes a three-dimensional position where a portion the first pitched ball is within the positional limits of the first strike zone in the second coordinate system.

In an embodiment, the processor is further configured to output a strike call when the first batter is the current batter and the flight of the first pitched ball includes the three-dimensional position where the first pitched ball is within the positional limits of the first strike zone in the second coordinate system; and output a ball call when the first batter is the current batter and the flight of the ball does not include a three-dimensional position where the first pitched ball is within the positional limits of the first strike zone in the second coordinate system.

In an embodiment, the first sensor arrangement includes a first camera and the second sensor arrangement includes a radar device and a second camera, the second sensor arrangement being mounted in a high home position.

In an embodiment, the first and second cameras and the radar device are time synced to one another, and the processor is further configured to identify a time of a key moment relating to the first pitched ball based on data from the radar device; and select an image from one of the first and second cameras corresponding to the time of the key moment to map the biometric characteristics of the current batter to the upper positional limit and the lower positional limit of the first strike zone for the current batter.

In an embodiment, the processor determines that the flight of the first pitched ball includes a three-dimensional position where a portion of the first pitched ball is within the positional limits of the first strike zone in the second coordinate system when any one of the three-dimensional positions of the first pitched ball is no further than one radius of the first pitched ball from the positional limits of the first strike zone in the second coordinate system.

In an embodiment, the biometric characteristics of the first batter are mapped to the upper positional limit and the lower positional limit of the first strike zone based on a first identified anatomical feature of the first batter corresponding to the lower positional limit of the first strike zone.

In an embodiment, the biometric characteristics of the first batter are mapped to the upper positional limit of the first strike zone based on a predetermined height added to a height of a second identified anatomical feature of the first batter.

In an embodiment, the upper positional limit of the first strike zone is determined by adding a predetermined height to a height of the first identified anatomical feature of the first batter.

In an embodiment, the predetermined height is based on the biometric characteristics of the first batter.

In an embodiment, the positional limits of the first strike zone are determined in the second coordinate system based on a plane corresponding to a width of a home plate in a vertical plane perpendicular to a line from a center of a pitching rubber to a center of the home plate.

In addition, the present disclosure relates to a system including a first sensor arrangement configured to capture one or more images including a first batter; and a processor configured to calibrate a first coordinate system of the first sensor arrangement to a second coordinate system of a baseball field; when the first batter is a current batter, determine pose data corresponding to a three-dimensional pose of the first batter based on the one or more images and the calibration of the first sensor arrangement to the baseball field; map the pose data of the first batter to at least one of an upper positional limit and a lower positional limit of a first strike zone for the first batter; and determine positional limits of the first strike zone in the second coordinate system based on the mapped at least one of the upper and lower positional limits of the first strike zone.

In an embodiment, the system further includes a second sensor arrangement configured to track a flight of a first pitched ball, wherein the processor is further configured to determine whether the flight of the first pitched ball includes a three-dimensional position where a portion the first pitched ball is within the positional limits of the first strike zone in the second coordinate system.

In an embodiment, the processor is further configured to output a strike call when the flight of the first pitched ball includes the three-dimensional position where the ball is within the positional limits of the first strike zone in the second coordinate system; and output a ball call when the flight of the first pitched ball does not include a three-dimensional position where the first pitched ball is within the positional limits of the first strike zone in the second coordinate system.

In an embodiment, the ball call is output only when the flight of the first pitched ball does not include a three-dimensional position where the first pitched ball is within the positional limits of the first strike zone in the second coordinate system and no swing of the first batter is detected.

BRIEF DESCRIPTION OF THE DRAWINGS

FIG. 6 shows a method for determining a pitch according to a first exemplary embodiment.

DETAILED DESCRIPTION

Figures 1, 2:
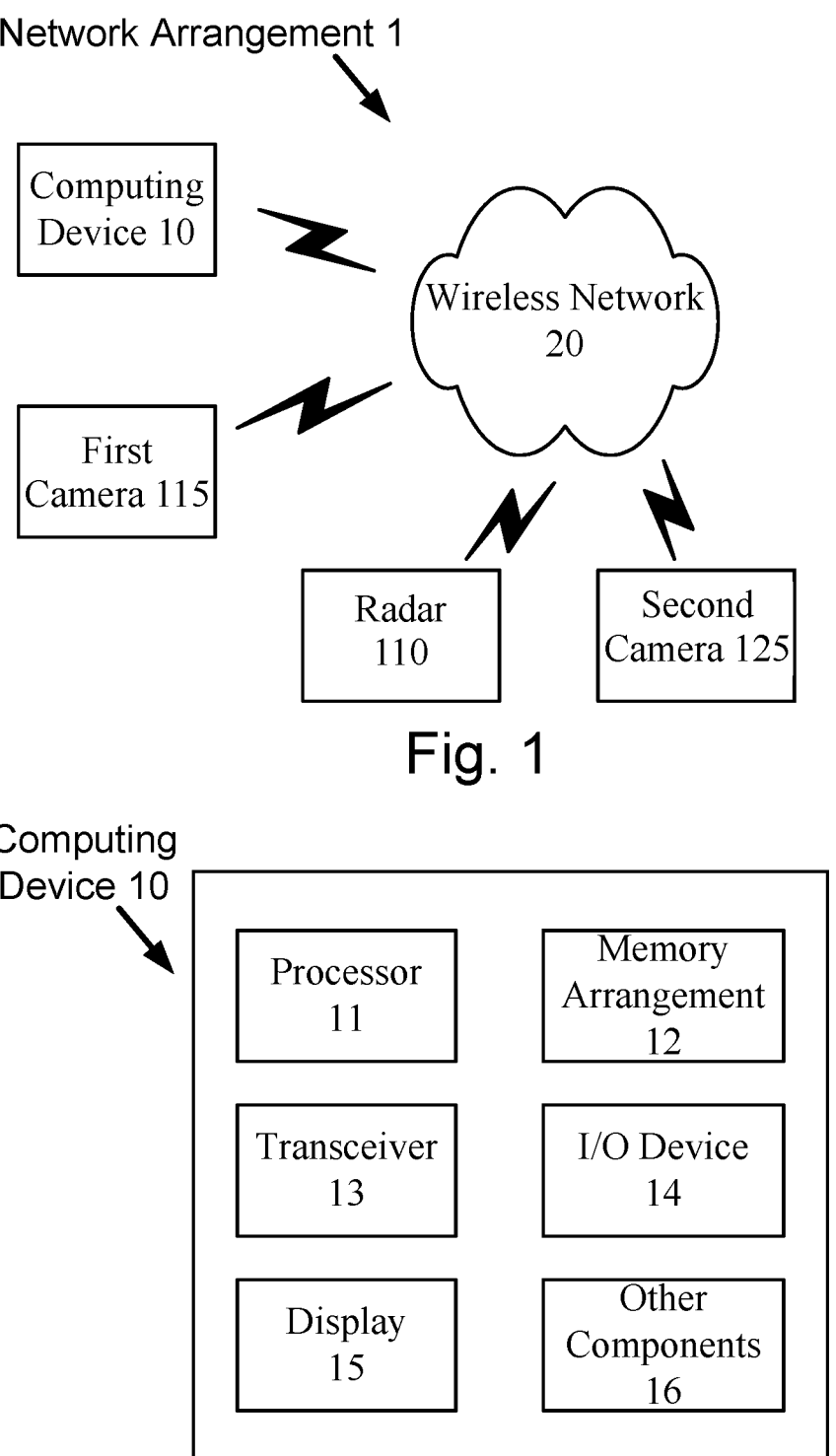
FIG. 1 shows an exemplary network arrangement according to an exemplary embodiment.
FIG. 2 shows an exemplary computing device according to an exemplary embodiment.

The exemplary embodiments may be further understood with reference to the following description and the related appended drawings, wherein like elements are provided with the same reference numerals. The exemplary embodiments relate to a system and method for umpiring a baseball game or for assisting in umpiring a baseball game. Although exemplary embodiments detailed herein describe the umpiring of baseball games, those skilled in the art will understand that the accurate tracking of any ball or other sports projectile may be performed in conjunction with a knowledge of the rules of the game and the dimensions and locations of key items within and around a field of play to enable an embodiment to make rules-based calls in any such game. For example, an embodiment employing similar hardware combined with a processing arrangement including data corresponding to the location and dimensions of any field of play can determine whether a ball or any other tracked item has passed out of the field of play at any time or has passed out of a designated part of a field of play at any time or at a designated time or under predetermined conditions. Furthermore, as would be understood by those skilled in the art, the embodiments described may be used to make the final decision for all or any desired subset of rules-based calls (e.g., strikes and balls) or may provide to a human decision maker (e.g., an umpire or referee) an indication of a system determined decision with respect to any rules-based call in a manner that allows the human decision maker to consider this determination in making his/her decision. For example, such a system may include a wireless connection to an earpiece or other communication device that provides to the human decision maker an audible signal indicative or the system's determination with respect to any call which indication may be over-ruled or disregarded by the human decision maker in accord with predetermined rules.

FIG. 1 shows an exemplary network arrangement 1 according to an exemplary embodiment. The network arrangement 1 includes a computing device 10 configured to communicate, via a network 20 (e.g., a wireless network), with a plurality of data gathering devices (e.g., a first camera 115, a radar 110 and a second camera 125). The first camera 115, the radar 110 and the second camera 125 may capture data (e.g., raw data) about a field of play, players on the field of play and a ball in the field of play, e.g., a baseball pitched by a pitcher as well has hit and other thrown balls. Specifically, the first camera 115, the radar 110 and the second camera 125 may be configured to capture data corresponding to the location and dimensions of the field of play, as well as the locations and dimensions of key items within and around the field of play. Furthermore, the first camera 115, the radar 110 and the second camera 125 may be configured to transmit the captured data to the computing device 10 via the network 20.

The computing device 10 may be configured to perform methods described below. The computing device is capable of receiving the captured data via the network 20. The captured data may be processed by the computing device 10 to generate output data. For example, the output data may be indicative whether a ball or any other tracked item has passed out of the field of play at any time or has passed out of a designated part of a field of play at any time or at a designated time or under predetermined conditions, where a batted ball makes contact with the ground or any part of a field or stadium, etc.

As one with ordinary skills in the art will understand, an actual network arrangement may include any number of computing devices and any number of data gathering devices (e.g., cameras, radars, etc.). Thus, the network arrangement 1 having one computing device 10, one radar 110 and two cameras 115, 125 is merely provided for illustrative purposes.

FIG. 2 shows the computing device 10 according to an exemplary embodiment. The computing device 10 may include a processor 11, a memory arrangement 12, a transceiver 13, an input/output (I/O) device 14, a display device 15, and other components 16.

The processor 11 of this embodiment is configured to perform various procedures between the computing device 10 and the network 20. In the exemplary embodiment, the processor 11 executes a program that interprets the captured data transmitted from the first camera 115, the radar 110 and the second camera 125 to the computing device 10 to make determinations about the paths of travel of various batted and thrown balls to determine how these paths impact the rules and play of the game. For example, the processor 11 of this embodiment may determine, based on the data from the first camera 115, the radar 110 and the second camera 125 whether a ball or any other tracked item has passed out of the field of play at any time or has passed out of a designated part of a field of play at any time or at a designated time or under predetermined conditions, etc.

In further exemplary embodiments, the processor 11 may be split among two or more processors to execute the program or a plurality of programs. For example, in one of the further exemplary embodiments a first processor may interpret the captured data to determine the dimensions of a part of the field of play, a second processor may interpret the captured data to determine whether a pitch is a ball (i.e., the pitch is outside the designated part of the field of play) or a strike (i.e., the pitch is within the strike zone or contacts the bat or a designated part of the field of play, etc.).

The memory arrangement 12 of this embodiment is a hardware component configured to store data related to operations performed by the computing device 10. In the exemplary embodiment, the memory arrangement 12 is configured to store the captured data from the first camera 115, the radar 110 and the second camera 125, as well as data output by the processor 11. The transceiver 13 in this embodiment is a hardware component configured to establish a connection with the network 20 and, thus, e.g., with the first camera 115, the radar 110 and the second camera 125, to receive the captured data.

Accordingly, the transceiver 13 may operate on a variety of different frequencies or channels (e.g., set of consecutive frequencies). The input/output (I/O) device 14 may be a hardware component that enables a user to enter inputs. The display device 15 may be a hardware component configured to make communications relating to data, for example, whether a pitch was a ball or a strike. The other components 16 may include, for example, an audio input device, an audio output device, a power supply, a data acquisition device, ports to electrically connect the computing device 10 to other devices (e.g., the first camera 115, the radar 110 and the second camera 125, etc.).

Figure 3:
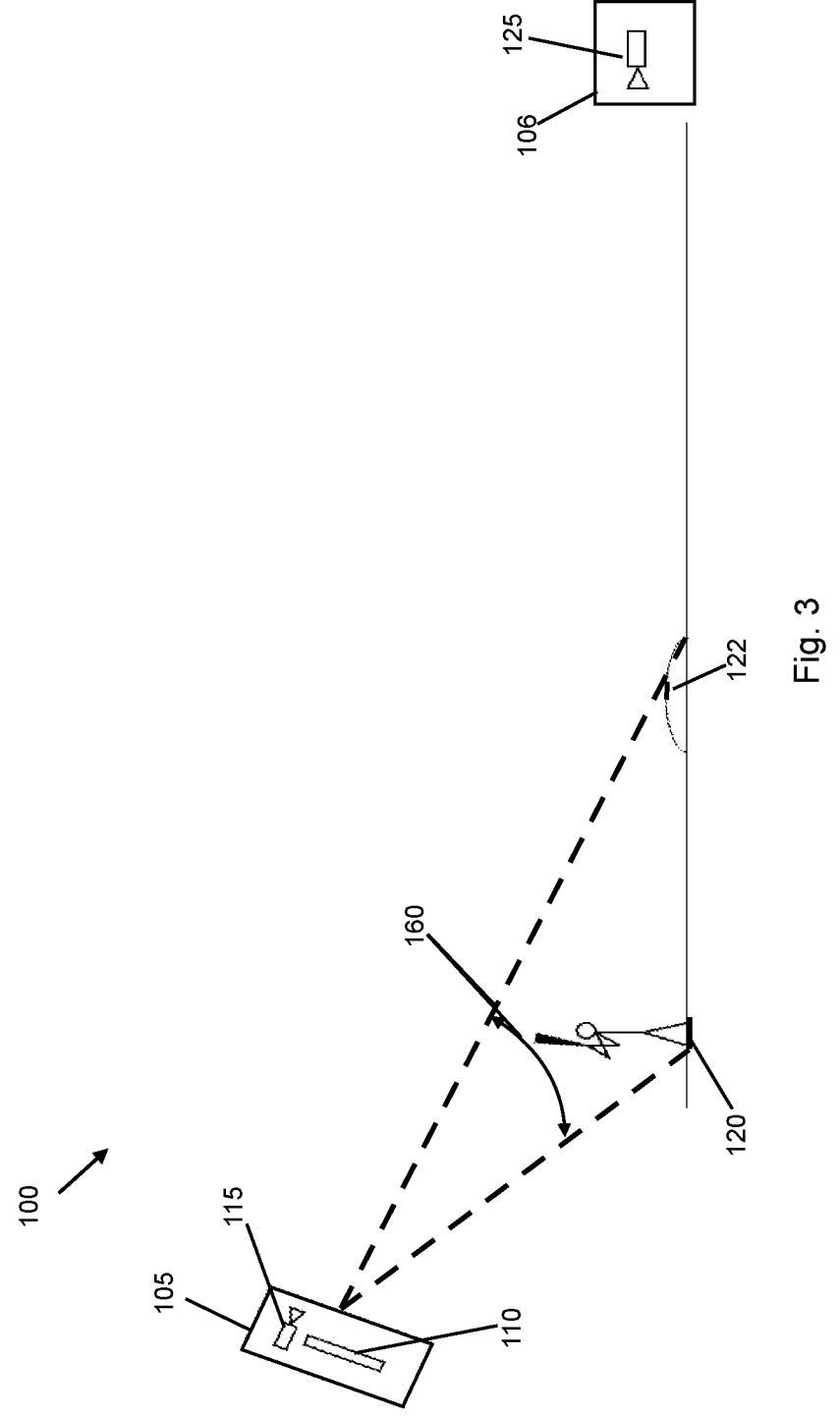
FIG. 3 shows a side view of a system according to a first exemplary embodiment.

FIG. 3 shows an exemplary system 100 for measuring baseball flight and evaluating pitches. The system 100 is a radar-camera tracking system and includes a first sensor arrangement 105 in the "high home" position which, in this example, includes a combined radar-camera arrangement, e.g., the radar 110 and the first camera 115, mounted at an elevation above that of a home plate 120 and behind the home plate 120 (i.e., on a side of the home plate 120 opposite a pitcher's rubber 122). As indicated above, the "high home" position is selected to provide as clear a view of the home plate 120 as possible by elevating the first camera 115 and the radar 110 to a height that minimizes obstruction from the batter, the catcher and the umpire while providing a view of the home plate 120 as straight on as possible with respect to the flight path of pitched balls.

The exemplary system 100 additionally includes a second sensor arrangement 106 in a center field position which, in this example, includes a camera (e.g., the second camera 125). Each of the radar 110, the first camera 115 and the second camera 125 has a field of view (e.g., a field of view 160 of the first sensor arrangement 105) covering the area through which pitches are expected to traverse, including the area from the pitcher's rubber 122 to the batter's box (i.e., above the home plate 120), as described above. As would be understood by those skilled in the art, every practical location for each of the radar 110, the first camera 115 and the second camera 125 will likely be subject to some degree of obstruction during a game as players positions are not entirely predictable or controllable.

For example, the second camera 125 may be positioned to give an optimum view of the home plate 120 when there is a right handed pitcher pitching to a right handed batter as this is the most common situation. However, those skilled in the art will understand that other positions for any of the radar 110, the first camera 115 and the second camera 125 (or one or more additional sensor arrangements) may be provided to achieve the most obstruction free view of any given pitch. For example, a further centerfield sensor arrangement (not shown) may be provided (or the second camera 125 may be moved) when a left handed pitcher or a left handed batter is encountered. Those skilled in the art will understand that additional cameras may be placed in any desired position to ensure a desired line of sight to key positions for any scenario. For example, a camera may be placed on the third base side of the field to achieve a more complete view of a left handed batter.

Those skilled in the art will understand that the first and/or second sensor arrangements 105, 106 may include one or more data gathering devices as described above. In addition, a number of additional sensor arrangements may be utilized in the system 100.

Another important aspect of a pitch evaluation system, such as the system 100 above, is the calibration of the system 100 to the field, allowing observations in the local coordinate systems of each of the sensor arrangements to be transformed to field coordinates. Such a calibration can be determined using one or more of the following procedures.

Figure 4:
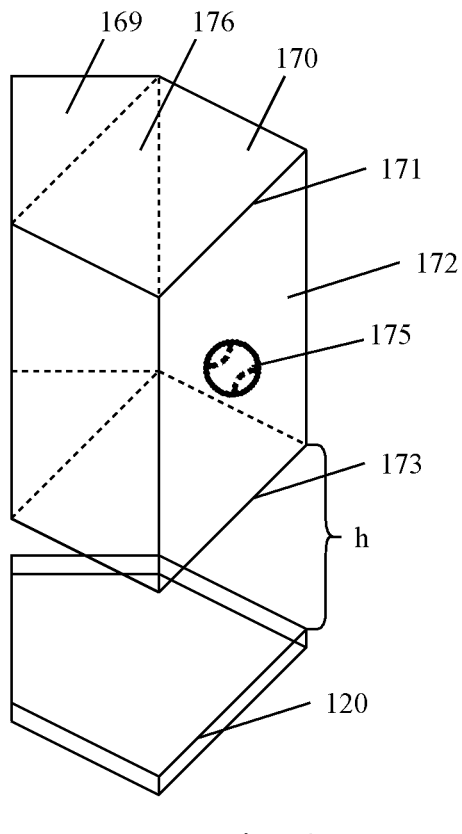
FIG. 4 shows a perspective view of a strike zone according to an exemplary embodiment.

FIG. 4 shows an exemplary method 400 for calibrating a pitch evaluation system (e.g., the system 100) to a field. To calibrate a camera (e.g., the first and/or second cameras 115, 125) to field coordinates, in 405, an image of the field is taken with the camera. In 410, features in the image, such as bases, a pitcher's rubber (e.g., the pitcher's rubber 122), a home plate (e.g., the home plate 120), and/or foul poles, are detected (e.g., manually annotated) or automatically detected using image recognition or any other known methods.

In 415, using knowledge of the imager intrinsic parameters (including, e.g., focal length, lens distortion parameters, etc.), and the positions of the features relative to one another (e.g., relative positions assumed from dimensions of a standard playing field or directly measured on a given field), the extrinsic parameters of the camera (including, e.g., position and orientation (e.g., pan, tilt, roll)) in relation to the field can be determined.

To calibrate a radar (e.g., the radar 110) to the field, at least one of the cameras may be used. In a combined radar/camera-based tracking system (e.g., the system 100), the radar-to-camera calibration may be used in combination with the camera calibration to the field as discussed above. In another exemplary embodiment of a radar-based tracking system, the camera may be attached to the radar and used for this specific purpose (e.g., the camera is calibrated to the field and the radar-to-field calibration is determined based on a known radar-to-camera calibration). The radar/camera calibration may be determined during a calibration step in production or at another opportune time by methods well-known to one skilled in the art.

In an alternative embodiment, rather than assuming relative positions of the features on the field (e.g., based on standard field dimensions and arrangement), a lidar scan of the field and surrounding structures may be captured. The lidar scan may capture the features discussed above, e.g., the bases, the pitcher's rubber, the home plate, and/or the foul poles as well as an arc of the field and the locations of fences or other physical or marked boundaries defining out of play areas, home run fences, etc. Similar to above, an image may be taken that captures one or several of these features. The features in the lidar scan and the image may be manually detected (e.g., annotated) or automatically detected, and subsequently matched. With these matches, the extrinsic parameters of the camera (e.g., position and orientation (e.g., pan, tilt and roll)) may then be determined from knowledge of the imager intrinsic parameters and the positions of the features as detected in the lidar scan.

The calibration may also include steps such as observing balls, hit, thrown or launched by a device or otherwise moving or bouncing in or through predetermined locations of the field.

After the tracking system (e.g., the radar-based, camera-based or combined radar/camera-based tracking system) has been calibrated to the layout of the field, the paths along which balls travel may then be observed, tracked and related to the layout of the field. The tracking system may observe/capture three-dimensional positions of baseballs in flight and determine trajectory for each ball by fitting a polynomial or physical model to the observations, thus, smoothing the data and reducing inherent noise on the individual position measurements. When a flight trajectory of a baseball has been determined, it is a simple procedure to evaluate the mathematical representation of the trajectory at specific time instances or places on the field (or above the field—i.e., to determine if a ball is passing through a space extending vertically over the plate and at what height the balled passed through this space, if a ball has left the field in fair or foul territory, etc.). Thus, the data points corresponding to the location of the baseball as it crosses over or near home plate may be determined. The systems may achieve accuracy of this location measurement relative to the plate within less than one inch.

To determine whether a pitch is a ball or strike, the system 100 determines whether the trajectory of the ball passes through a 3D shape 169 defined by a volume extending vertically over the home plate 120 (e.g., having a size and shape in any horizontal plane the same as that of the home plate 120) and between the lower and upper limits of the strike zone. In some cases, as shown in FIG. 4, a simplified model of a simplified strike zone 170 may be used to determine whether a ball 175 passes through the strike zone 170. The strike zone 170 may have the shape, for example, of a rectangular cuboid 172 extending vertically between an upper limit 171 (e.g., an upper horizontal planar surface having the dimensions of the rectangular portion of the home plate 120) and a lower limit 173 (e.g., a lower horizontal planar surface having the dimensions of the rectangular portion of the home plate 120) so that the strike zone 170 is the size and shape of the front (e.g., a pitcher-facing side) of a 3D shape 176 of the home plate 120 (e.g., neglecting the triangular shape extending from the rectangular front of the home plate 120 away from the pitcher's rubber to the intersection of the foul lines). The strike zone 170 is a height h above the home plate 120. The height h may correspond to a height from the home plate 120 to a batter's knees when the batter is in the batter's box but may be determined in any manner consistent with the rules of a given league or any future changes to the rules of baseball.

As would be understood by those skilled in the art, a further simplified strike zone may be defined based on a vertically extending plane centered over the home plate 120 and having the same width (i.e., an extent in a direction perpendicular to a line from the pitcher's rubber to the home plate 120). The portion of the plane defining such a further simplified strike zone would be equal in width to the home plate 120 and centered over any desired point on home plate 120 (e.g., a front edge of home (closest to the pitcher), a center of home plate, etc.). As the trajectory determined by the tracking system corresponds to the center of the baseball and a pitch is a strike if any part of the ball passes through any portion of the strike zone, it may be advantageous to use a mathematical representation of the strike zone which is larger than the true strike zone by half a ball diameter when determining the ball/strike call. Alternatively, the system may call a strike whenever a center of the ball is determined to be within the strike zone or within one half the diameter of the ball of the strike zone. Those skilled in the art will understand that this allowance for the radius of the ball will be effective in conjunction with any of the strike zones described herein.

Existing or Naïve Approach to Pitch Determinations Based on Preexisting Player Knowledge In general, it is a relatively simple concept to use ball position measurements to automatically determine whether a pitch passes over the plate and to determine at what height the ball was if and when it passed over any part of the plate (e.g., was the ball within the strike zone as it passed over any part of the plate) and then to implement some means to signal this to an official on the field. However, to make an accurate strike/ball determination according to the official strike zone definition, as described above, is more difficult and may require some knowledge and/or assumptions about the upper and lower limits of the strike zone that depend on the height, limb length and stance of the individual player as that stance varies while the player is in the batter's box. The following methods may be employed, each referring to FIG. 4 and having various benefits/detriments.

In a first option, the upper and lower limits 171, 173 of the strike zone 170 can be used. For example, the strike zone 170 may be defined based on the upper and lower limits 171, 173 that depend on the league and/or the age bracket of players in that league. For example, each of the upper and lower limits 171, 173 may be defined as a constant height above the ground for each of the upper and lower limits 171, 173 (e.g., the same for every batter) based on an average height of players in the league and/or average limb lengths of the players, and an assumption about the relationship between these characteristics and the strike zone 170 as it would be defined based on the rules as applied to a person having these characteristics.

Alternatively, the upper and lower limits 171, 173 of the strike zone 170 size may be determined by observing the stances of several players from the league and determining average values for the upper and lower limits 171, 173. The main benefit of such upper and lower limits 171, 173 to the strike zone 170 is simplicity. However, this simplistic approach does not allow for the variation in size and stance between individual players and will result in inaccurate calls for certain pitches as, depending on the characteristics/stance of any player, the actual strike zone may be larger or smaller than, or shifted up/down relative to, a predetermined strike zone.

In a further option, the upper and lower limits 171, 173 of the strike zone 170 are individualized for each player based on biometric characteristics of the player (e.g., height and/or limb length) and information relevant to a standard batting stance. This method assumes that player height and/or limb length is available from an external source when running the system (e.g., from an online database). The strike zone 170 may then be based on biometric characteristics (e.g., height and/or limb length of the player) and assumptions/information about the mapping of these biometric characteristics to the upper and lower limits 171, 173 of the strike zone 170 when such a player is in a standard batting stance. For example, this mapping may be learned from data obtained by observing a large number of players in their batting stances and relating the biometric characteristics of the players to the stances and the measured upper and lower limits 171, 173 of the strike zone 170 in each case. This option has the benefit of creating the strike zone 170 individualized for each player's biometric characteristics. However, this option does not consider the particular stance for each player.

Additionally, this option requires a database of player information (e.g., height, limb lengths for every player) that would need to be updated regularly as new players are introduced. Alternatively, the strike zone 170 may be created by measuring one more easily determined biometric characteristic. For example, it may be easier to accurately determine the lower limit 173 of the strike zone 170 as the bend in the knees is readily apparent in images when a player enters the batting stance. The system may then generate the upper limit 171 for the strike zone 170 that is a predetermined multiple of the height of the measured lower limit 173 or that is higher than the lower limit 173 by a predetermined percentage of a player's height or using any other formula arrived at, for example, by examining the batting stances of a large number of players.

In a third option, the upper and lower limits 171, 173 of the strike zone 170 are individualized for each player based on individual, historical data concerning the individual's stance in prior at bats. For example, the strike zone 170 may be based on the observed stance of the individual player through several prior games. One such system is said to be employed by the MLB, where a center field camera (e.g., the second camera 125) is used to observe players in their stances to make measurements relating to the upper and lower limits 171, 173 of the strike zone 170.

Historically, a center field camera has been used as it is difficult from an image from other locations (e.g., a high home location) to determine the knee height and shoulder/pant line height of the batter, and it has been a manual process to set lines in the image corresponding to the proper strike zone limits. A rolling average, or other low-pass filter, may be used on the data from the most recent games to generate a representative strike zone to be used in the current game for each player. This option has the benefit of generating an individualized strike zone considering the stance and biometric characteristics for each player. However, this option may also introduce various inaccuracies. For example, data captured and averaged from multiple prior games may not reflect recent changes to a batter's stance which may change even between or during at-bats in a single game. Additionally, it may be difficult or impossible to generate individualized upper and lower limits to the strike zone for a new player for which no previous data is yet available.

Methods for Pitch Determinations

In a first exemplary embodiment, biometric characteristics (e.g., height and/or limb length) are determined for a current batter from one or more images captured from one or more cameras calibrated to the field. Similar to the second option discussed above, the first exemplary embodiment does not consider the stance of the batter. Rather, an assumption is used with regard to the mapping from the biometric characteristics of a player to generate upper and lower limits for the strike zone based on a standard stance of a player having these characteristics.

Figure 5:
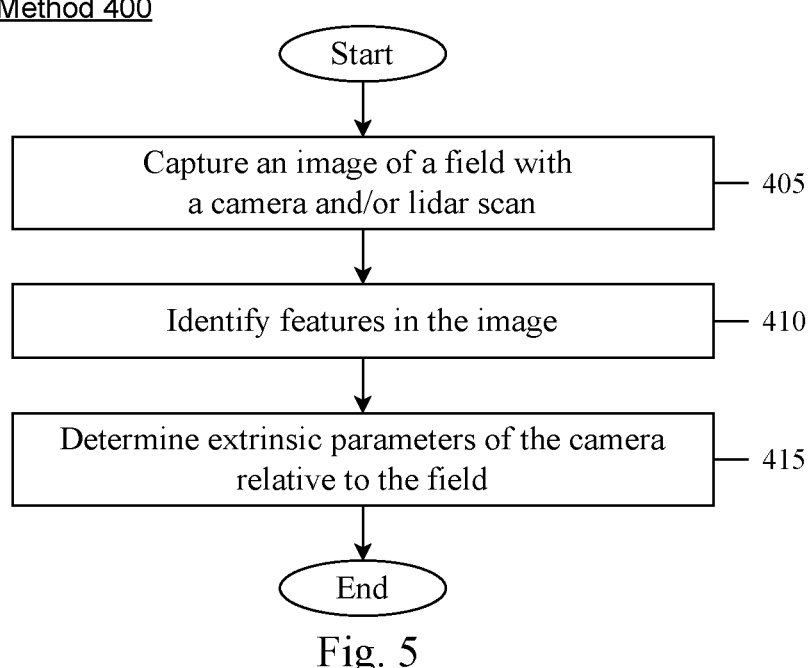
FIG. 5 shows a method for calibrating a pitch evaluation system to a field.
Figure 7:
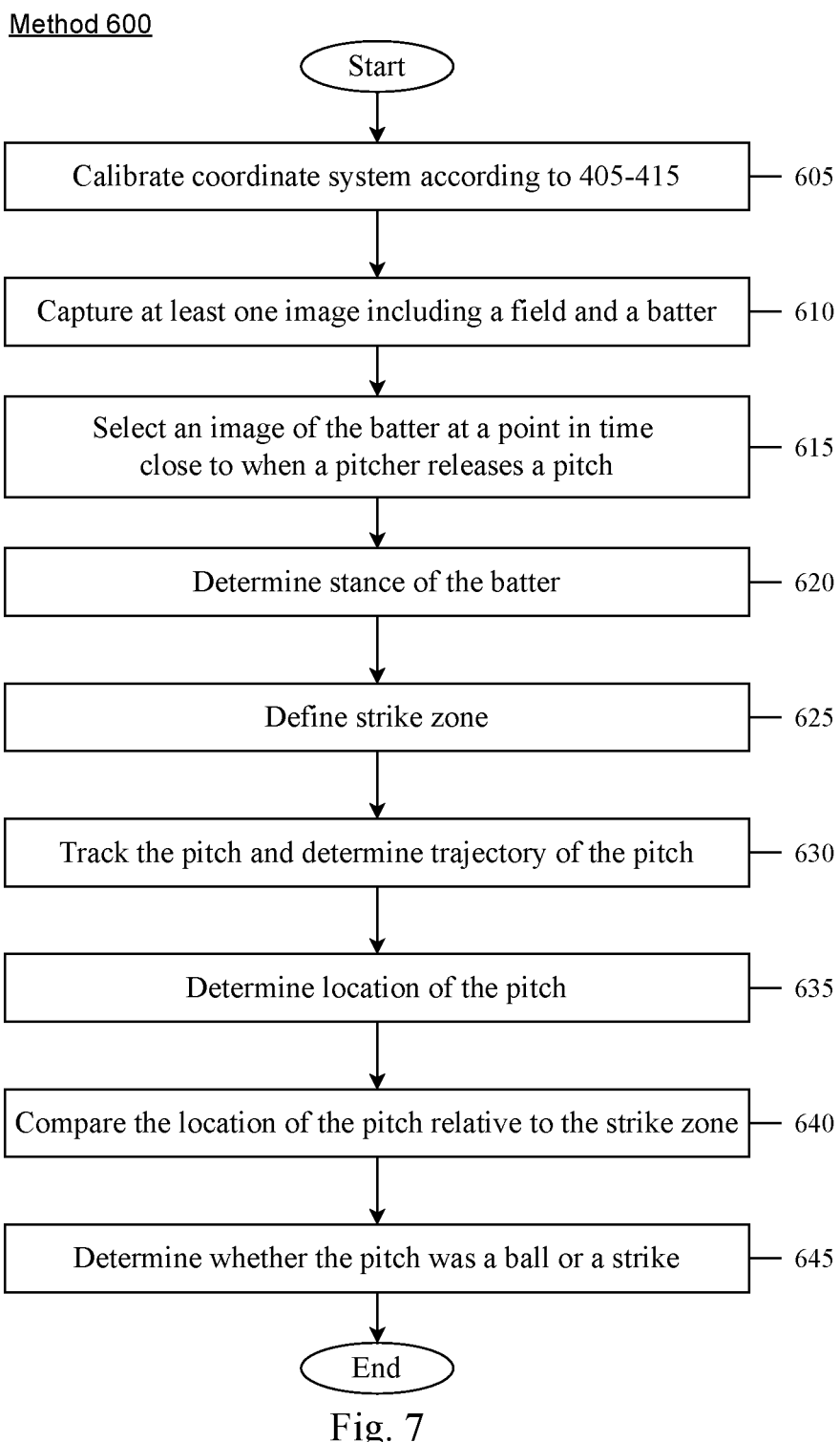
FIG. 7 shows a method for determining a pitch according to a second exemplary embodiment.

FIG. 5 shows a method 500 determining (calling ball or strike for) a pitch according to the first exemplary embodiment including the following steps. In 505, a first coordinate system of a first camera is calibrated to a second coordinate system of a baseball field according, for example, to steps 405-415 of method 400. In 510, one or more images of a baseball field (specifically including an area around home plate) is captured, the one or more images including a particular player (e.g., a batter). In 510, the player is detected in the image. The detection may include a manual identification of the player or an automatic detection using image recognition methods. Additionally, re-identification methods may be used to detect the same player in previous frames or images to increase the accuracy of the detection. For example, depending on the particular implementation, it may be important to detect the player in an upright position.

In 515, the biometric characteristics (height and/or limb length) of the player are determined based on analysis of an image(s). The biometric characteristics determination may be performed based on the camera calibration and methods for extracting features from an image of a human, for example, human pose detection or some other method. In 520, a predefined relationship between the biometric characteristics and the strike zone upper and lower limits is used to define a strike zone size for the player. The predefined relationship between height/limb length and strike zone may, for example, be a mapping that is learned from data, e.g., from observations of actual strike zone upper and lower limits determined based on analyses of a number of players with known biometrical characteristics as they take their batting stances.

In 525, a pitch is tracked using a tracking system as described above, e.g., using radar and/or camera(s), and a trajectory of the pitch is determined. In 530, pitch location data is determined for the pitch as it crosses over or near home plate, as described above. In 535, the pitch location is compared to the previously determined 2d or 3d strike zone, and in 540, a strike/ball call is outputted depending on whether the pitch does or does not pass through at least a portion of the determined strike zone. As indicated above, if the trajectory is considered to represent the path of travel of a center of the ball, to determine if any portion of the ball enters any part of the strike zone, the system may add a distance equal to a radius of the ball to each dimension of the strike zone and then consider any trajectory that passes through any portion of this expanded zone a strike.

Alternatively, the system may consider as a strike any trajectory that passes through any portion of the strike zone or which comes to within a distance of one radius of the ball from any portion of the strike zone. Furthermore, as would be understood by those skilled in the art, a representation of a trajectory of the ball may be determined based on detected positions as indicated above and strikes may be called based on a comparison of this representation of the trajectory to the strike zone as opposed to the comparison of actual measured positions to the strike zone.

When the first exemplary embodiment is used, it is not required to populate and use a database of biometric characteristics or previous observations of a player. That is, the method described above may be performed ad hoc prior to each at-bat. This advantageously allows for a strike zone determination that does not rely on any prior knowledge of a player.

In this scenario, the current batter may be detected/tracked in several images while walking to the batter's box. This enhances the ability of the system to accurately determine the relevant biometric characteristics of the player as, for example, the height/limb length measurements are based on measurements from multiple images and averaged (or otherwise combined) to refine the results. The system may then employ a model generating standard upper and lower limits for the strike zone based on the detected biometric characteristics as described above or by detecting, when the player takes his batting stance, the key body parts (e.g., knees, hips and shoulder) by which the strike zone is defined and determining upper and lower limits for a strike zone for each game, at bat or even each pitch based on this data.

In an alternative embodiment, the player does not need to be detected (nor do biometric characteristics need to be determined) immediately prior to (or during) an at-bat. In this alternative embodiment, biometric characteristics are measured at any time prior to an at-bat and stored for use in future at bats. Thus, this embodiment is flexible with regard to the timing of the detection of the player and the player characteristics.

Additionally, once the characteristics have been detected, it is no longer necessary to detect the player's biometric characteristics again for subsequent at-bats. The system may employ lineup information and associate a height/limb length detection with a player so that the information may be used for any number of at-bats. Thus, the system may employ a database storing these biometric characteristics for each player to generate a strike zone every time the player comes to bat. The database may be newly generated for each ball game, or the information determined from one game may be carried over to subsequent games. Those skilled in the art will understand that, in this embodiment, the system needs only to identify the player coming to bat to generate the strike zone. As would be understood, this identification may be based on various factors or any combination of such factors including a known batting order, detected name or player number information on the uniform, facial recognition, manual identification, etc.

In a second exemplary embodiment, a stance is determined for a current batter from one or more images captured from one or more cameras calibrated to the field. Similar to the third option discussed above, the second exemplary embodiment determines a strike zone based on an observed stance. However, instead of using historical data (e.g., images from recent games), in this embodiment the stance is detected at a time close to the pitch release at a time selected to correspond to the batter taking his stance (e.g., during the pitcher's wind-up, as or immediately before the pitch is thrown or during the flight of the pitch).

FIG. 6 shows a method 600 for determining a pitch according to the second exemplary embodiment including the following steps. In 605, one or more images of the player (batter) is captured during the time(s) surrounding the release of the pitch. In 610, an image close to pitch release (or some other predefined time during the flight of the pitch) is selected for use in the stance determination.

In 615, a three-dimensional stance of the player is determined based on the image and the camera calibration or, at the very least, the height above the ground of certain key features of the player are determined to establish the upper and lower limits of the strike zone. For example, a monocular 3D pose may be determined when only a single camera is used, while a multi-view (e.g., triangulation-based) 3D pose may be determined when multiple cameras are used. The stance may be determined using, for example, a neural network trained to detect 2D or 3D pose from a calibrated camera, or any other relevant data as would be understood by those skilled in the art.

In 620, the strike zone size is determined for the player based on the determined 3D pose and the predefined rules relating the strike zone to the stance. In 625, a pitch is tracked using a tracking system as described above (e.g., using radar and/or camera(s)) and a trajectory of the pitch is determined. In 630, pitch location data is determined for the pitch as it crosses over or near home plate, as described above. In 635, the pitch location is compared to the previously determined strike zone, and a strike/ball call is outputted depending on whether the pitch is inside or outside the determined strike zone.

Similar to the first exemplary embodiment, when the second exemplary embodiment is used, it is not required to populate and use a database of pose/stance observations of a player. That is, the methods 500, 600 described above may be performed ad hoc prior to (or during) each at-bat. This may advantageously allow for a strike zone determination that does not rely on any prior knowledge of a player.

However, some prior knowledge may be used to improve various aspects of the stance detection method. For example, the 3D pose detection during the stance can be improved by prior knowledge of the height and limb length of the player. This information may be determined from the step 510 and the step 515 of the method 500 discussed above (height and/or limb length detection method) based on images captured prior to the at bat or, should prior knowledge of the player be available, from a database of height/limb length information. Similar to the first embodiment, the system can employ lineup information to use one stance detection from early in the game for any number of subsequent at-bats.

Figure 8:
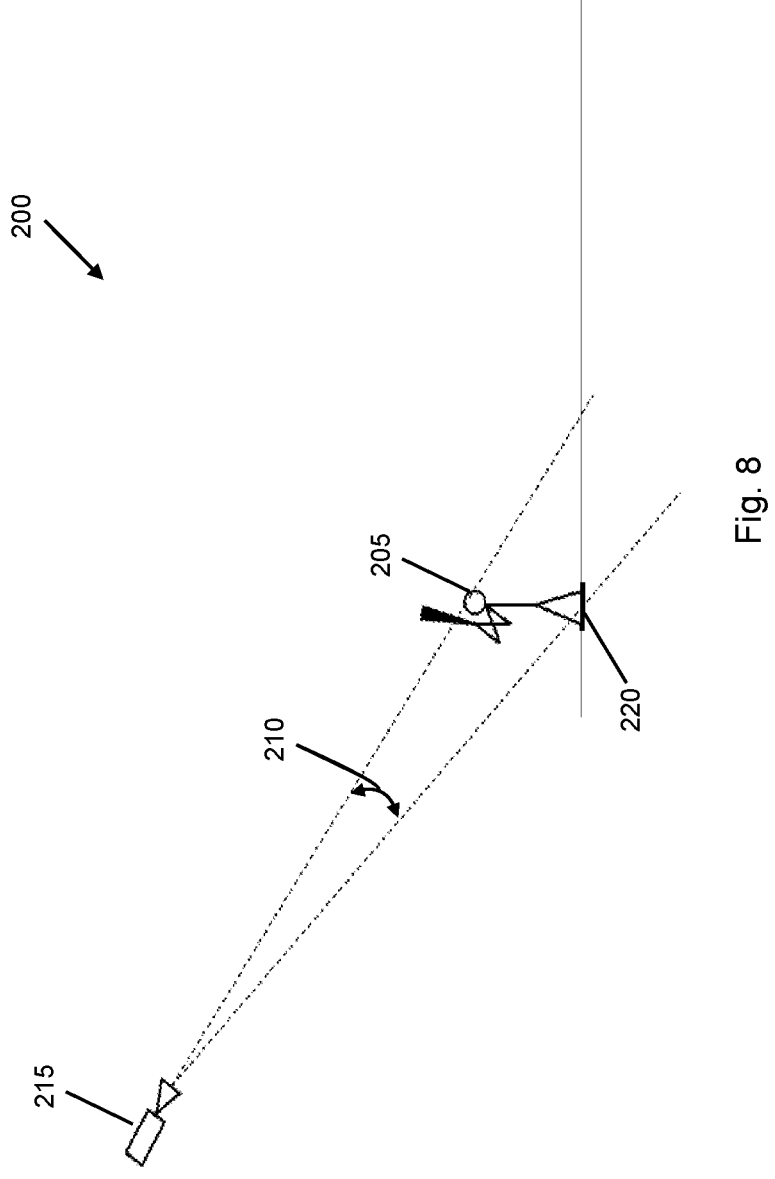
FIG. 8 shows a side view of a camera in the high home position.

For either of the first or second exemplary embodiments (e.g., the methods 500, 600), the system can employ the same camera(s) used for tracking the pitched ball to determine height/limb length or stance of a batter. FIG. 8 shows an exemplary system 200 for determining biometric characteristics and/or features of a stance of a batter 205 relevant to determining the upper and lower limits of the strike zone for the batter 205. The exemplary system includes a camera 215 in the "high home" position (or in any other suitable location) which, in this example, captures images that are used for a height/limb length or 3D pose determination. The camera 215 has a field of view 210 covering the batter's box area.

For a radar-only tracking system, or for a combined radar/camera tracking system where the position of the tracking camera(s) is not necessarily ideal for detecting the biometric characteristics or stance of the batter 205, it may be advantageous to employ an additional external camera(s) and sensor arrangement(s). Any camera with known intrinsic parameters may be used to enable the system to detect the height/limb length or stance of the batter 205 as would be understood by those skilled in the art.

Figure 9:
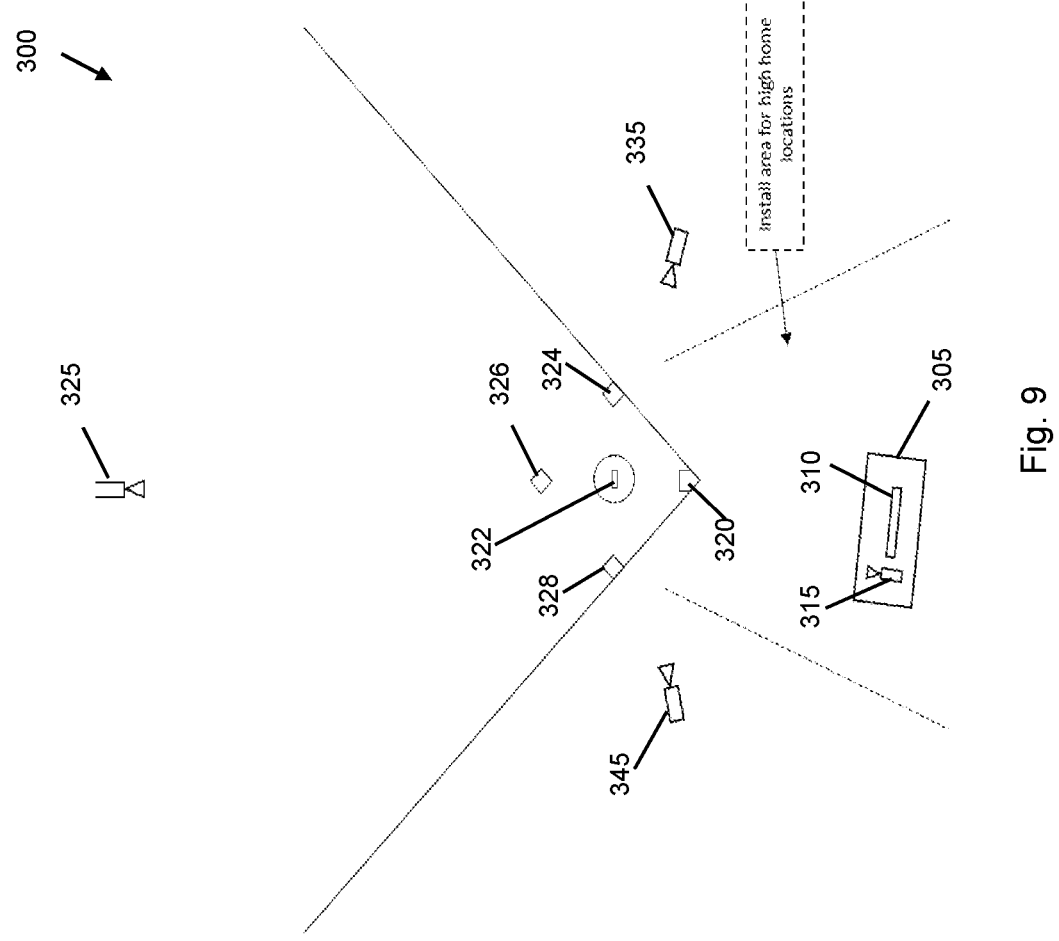
FIG. 9 shows an overhead view of a system according to a second exemplary embodiment.

FIG. 9 shows an exemplary tracking system 300 for measuring trajectories of baseballs, evaluating pitches and determining the biometric characteristics and/or stance of a batter to define the strike zone. The system 300 includes a first sensor arrangement 305 in, for example, the "high home" position which, in this example, includes a combined radar/camera arrangement, e.g., a radar 310 and a first camera 315. The system 300 of this example additionally includes a second sensor arrangement 325 in, for example, a center field position which, in this example, includes a second camera 325. The radar 310 and the first and second cameras 315, 325 are used for tracking pitched balls and are positioned and aimed to have fields of view including the area(s) where balls are pitched. The system 300 may optionally further include a third camera 335 on one side of the field and a fourth camera 345 on the other side of the field the third and fourth cameras 335, 345 being positioned and aimed to have fields of view including at least the batter's box area of the field, which may be used for determining the biometric characteristics and/or stance of the batter.

The second camera 325 is at least roughly time-synchronized to the system 300 and capable of sending images and/or video to the system 300 in a manner permitting the system 300 to correlate image data from the second camera 325 to radar data from the radar 310 and image data from the first camera 315 corresponding to the same times. That is, the time sync will be accurate at least to within a range less than a frame rate of the first camera 315 so that the system 300 can accurately identify a frame corresponding most closely to any selected radar data. By selecting one or more images from the second camera 325, detecting key features (e.g., a home plate 320, a pitcher's rubber 322, bases 324, 326, 328) in images from the second camera 325, and optionally detecting the ball in multiple consecutive frames from the second camera 325 during a pitch and correlating these detections with the trajectory determined by the system 300, the system 300 can determine the external parameters in relation to the field of the second camera 325.

Subsequent height/limb length or stance detection is based on the images selected from the second camera 325 at or near the time of release, or at some predetermined time during the flight of the pitch, and the calibration of the second camera 325. This also enables multi-view 3D pose estimation based on the second camera 325 and/or any additional external cameras such as the third and fourth cameras 335, 345 as well as the first camera 315 internal to the exemplary system 300.

It will be appreciated by those skilled in the art that changes may be made to the embodiments described above without departing from the inventive concept thereof. It should further be appreciated that structural features and methods associated with one of the embodiments can be incorporated into other embodiments. It is understood, therefore, that this invention is not limited to the particular embodiment disclosed, but rather modifications are also covered within the scope of the present invention as defined by the appended claims.

The invention claimed is:

1. A computer-implemented method for tracking pitched balls, comprising:

storing, by a memory, a predefined relationship between limb lengths and strike zone limits;

calibrating, by a processor, a first coordinate system of a first camera to a second coordinate system of a baseball field;

capturing, with the first camera, one or more images including a first batter;

determining, by the processor, biometric characteristics of the first batter including a first limb length based on the one or more images and the calibration of the first camera to the baseball field;

mapping, by the processor, the biometric characteristics of the first batter to an upper positional limit and a lower positional limit of a first strike zone for the first batter based on the predefined relationship stored to the memory;

determining, by the processor, positional limits of the first strike zone in the second coordinate system;

tracking, by a tracking system comprising at least one of a radar or at least one camera, a flight of a pitched ball; and outputting, by the processor, a strike call or a ball call based on the flight of the pitched ball relative to the positional limits of the first strike zone, wherein the strike call or the ball call is output by an audio output device as an audible signal or by a display device.

2. The method of claim 1, further comprising:

determining, by the processor, whether the flight of the ball includes a three-dimensional position where a portion the pitched ball is within the positional limits of the first strike zone in the second coordinate system.

3. The method of claim 2, further comprising:

determining, by the processor, a three-dimensional trajectory of the ball, wherein, determining whether the flight of the pitched ball includes a three-dimensional position where a portion of the pitched ball is within the positional limits of the first strike zone in the second coordinate system includes determining whether the trajectory of the pitched ball includes a three-dimensional position where a portion the pitched ball is within one radius of the pitched ball of the positional limits of the first strike zone in the second coordinate system.

4. The method of claim 2, further comprising:

outputting, by the processor, the strike call when the flight of the pitched ball includes the three-dimensional position where the pitched ball is within the positional limits of the first strike zone in the second coordinate system; and outputting, by the processor, the ball call when the flight of the pitched ball does not include a three-dimensional position where the pitched ball is within the positional limits of the first strike zone in the second coordinate system.

5. The method according to claim 1, wherein the tracking system includes a radar device and a second camera mounted in a high home position.

6. The method according to claim 5, wherein the first and second cameras and the radar device are time synced to one another, further comprising:

identifying, by the processor, a time of a key moment relating to the pitched ball based on data from the radar device; and selecting, by the processor, an image from one of the first and second cameras corresponding to the time of the key moment for mapping the biometric characteristics of the first batter to the upper positional limit and the lower positional limit of the first strike zone.

7. The method of claim 2, wherein it is determined, by the processor, that the flight of the pitched ball includes a three-dimensional position where a portion of the pitched ball is within the positional limits of the first strike zone in the second coordinate system when any one of the three-dimensional positions of the pitched ball is no further than one radius of the pitched ball from the positional limits of the first strike zone in the second coordinate system.

8. The method of claim 1, wherein the biometric characteristics of the first batter are mapped, by the processor, to the upper positional limit and the lower positional limit of the first strike zone based on a first identified anatomical feature of the first batter corresponding to the lower positional limit of the first strike zone.

9. The method of claim 8, wherein the biometric characteristics of the first batter are mapped, by the processor, to the upper positional limit of the first strike zone based on a predetermined height added to a height of a second identified anatomical feature of the first batter.

10. The method of claim 8, wherein the upper positional limit of the first strike zone is determined, by the processor, by adding a predetermined height to a height of the first identified anatomical feature of the first batter.

11. The method of claim 10, wherein the predetermined height is based on the biometric characteristics of the first batter.

12. The method of claim 1, wherein the positional limits of the first strike zone are determined, by the processor, in the second coordinate system based on a plane corresponding to a width of a home plate in a vertical plane perpendicular to a line from a center of a pitching rubber to a center of the home plate.

13. The method of claim 1, wherein the predefined relationship between the limb length and strike zone limits is determined from observations of actual strike zone upper and lower limits determined based on analyses of a number of players with known biometrical characteristics as the players assume batting stances.

14. The method of claim 1, wherein the strike call or the ball call is output to provide to a human decision maker an indication of a system-determined decision of the strike call or the ball call.

15. The method of claim 1, wherein the strike call or the ball call is output to provide an official system-determined decision of the strike call or the ball call that is able to be overruled by a human decision maker.

16. A system for tracking pitched balls, comprising:
a memory storing a predefined relationship between limb lengths and strike zone limits;
a tracking system comprising at least one of a radar or at least one camera configured to track flights of pitched balls;
a first camera capturing images of batters; and
a processor configured to perform operations comprising:
calibrating a first coordinate system of a first camera to a second coordinate system of a baseball field;
receiving, from the first camera, one or more images including a first batter;
determining biometric characteristics of the first batter including a first limb length based on the one or more images and the calibration of the first camera to the baseball field;

mapping the biometric characteristics of the first batter to an upper positional limit and a lower positional limit of a first strike zone for the first batter based on the predefined relationship stored to the memory;
determining positional limits of the first strike zone in the second coordinate system;
receiving, from the tracking system, tracking data for a flight of a pitched ball; and
outputting a strike call or a ball call based on the flight of the pitched ball relative to the positional limits of the first strike zone,
wherein the system further comprises at least one output device for outputting the strike call or the ball call, the at least one output device comprising:
an audio output device outputting an audible signal; or
a display device.

17. The system of claim 16, wherein the processor is configured to perform further operations comprising:
determining whether the flight of the ball includes a three-dimensional position where a portion of the pitched ball is within the positional limits of the first strike zone in the second coordinate system.

18. The system of claim 17, wherein the processor is configured to perform further operations comprising:
determining a three-dimensional trajectory of the ball,
wherein, determining whether the flight of the pitched ball includes a three-dimensional position where a portion of the pitched ball is within the positional limits of the first strike zone in the second coordinate system includes determining whether the trajectory of the pitched ball includes a three-dimensional position where a portion the pitched ball is within one radius of the pitched ball of the positional limits of the first strike zone in the second coordinate system.

19. The system of claim 17, wherein the processor is configured to perform further operations comprising:
outputting the strike call when the flight of the pitched ball includes the three-dimensional position where the pitched ball is within the positional limits of the first strike zone in the second coordinate system; and
outputting the ball call when the flight of the pitched ball does not include a three-dimensional position where the pitched ball is within the positional limits of the first strike zone in the second coordinate system.

20. The system of claim 16, wherein the tracking system includes the radar device and a second camera mounted in a high home position.

* * * * *